Nov. 18, 1941.  T. R. HARRISON  2,263,497
MEASURING AND CONTROL APPARATUS
Filed Sept. 24, 1938  3 Sheets-Sheet 1
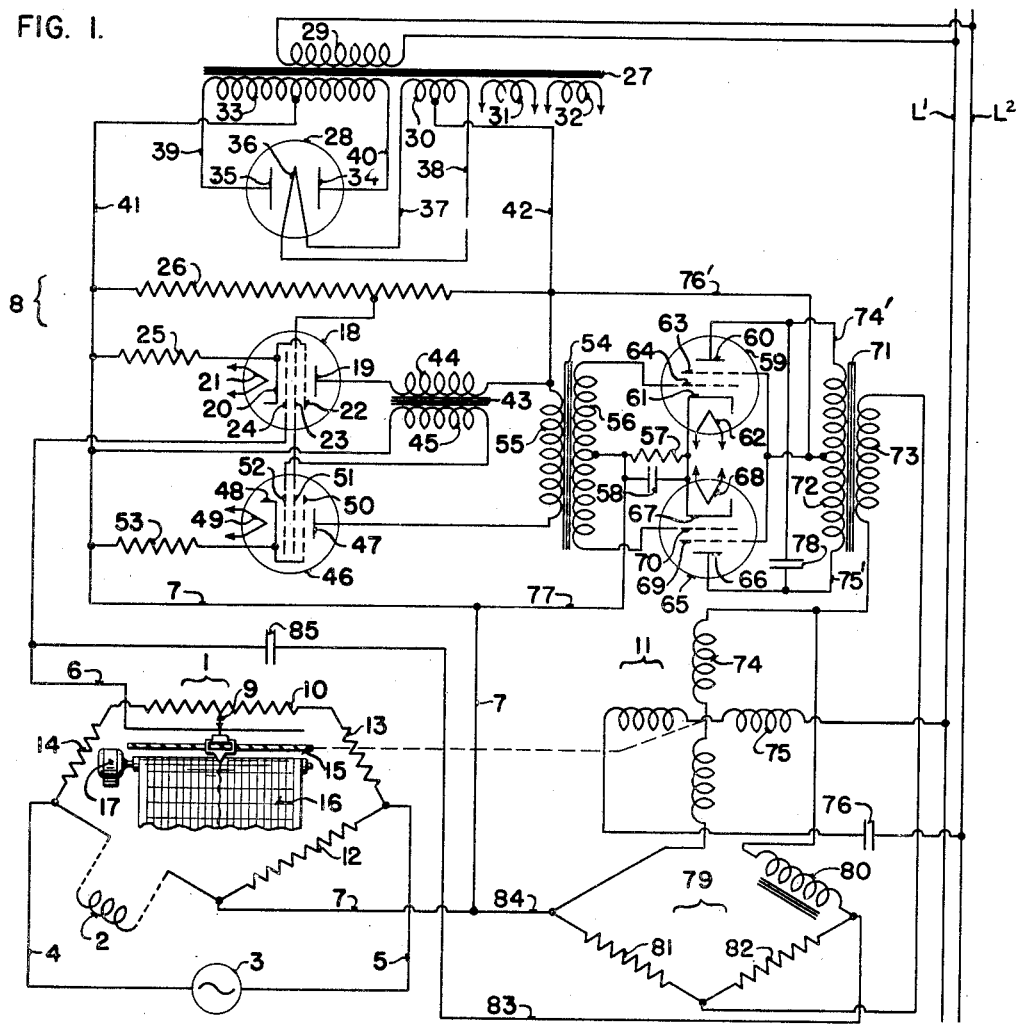
INVENTOR.
THOMAS R. HARRISON
BY [signature]
ATTORNEY.

Nov. 18, 1941.  T. R. HARRISON  2,263,497
MEASURING AND CONTROL APPARATUS
Filed Sept. 24, 1938  3 Sheets-Sheet 2

*INVENTOR.*
THOMAS R. HARRISON
BY *[signature]*
*ATTORNEY.*

Nov. 18, 1941.   T. R. HARRISON   2,263,497
MEASURING AND CONTROL APPARATUS
Filed Sept. 24, 1938   3 Sheets-Sheet 3

INVENTOR
THOMAS R. HARRISON
BY George M. ———
ATTORNEY

Patented Nov. 18, 1941

2,263,497

UNITED STATES PATENT OFFICE 2,263,497

MEASURING AND CONTROL APPARATUS

Thomas R. Harrison, Wyncote, Pa., assignor to The Brown Instrument Company, Philadelphia, Pa., a corporation of Pennsylvania Application September 24, 1938, Serial No. 231,565

21 Claims. (Cl. 172—239)

The present invention relates to improvements in automatic recording and control systems and apparatus therefor.

More specifically the invention relates to systems and apparatus for determining the magnitude or changes in magnitude of a measured condition, such as mechanical, chemical, electrical, physical, etc. and including suitable provisions for making a record of the changes and/or for maintaining said measured condition at a predetermined value. The invention is especially useful in pyrometric recording and control systems where it is desired to record and control the conditions of temperature at one or more remote points, for example in furnaces or kilns.

In accordance with my invention, upon change in magnitude of a measured condition, a normally balanced electrical network becomes unbalanced and initiates operation of a driving system for effecting a rebalancing adjustment of the network, and during the rebalancing operation an additional effect is produced which jointly with the unbalance of the network controls the driving system to obtain rebalance in a minimum of time without overshooting. Such provisions for preventing overshooting of the balance point of the network are desirable since the inertia of the various mechanically connected parts tend to so operate as to carry the driving system and associated rebalancing means beyond the true position of balance. When such a condition of overshooting prevails, the network then becomes unbalanced in the opposite direction and initiates operation of the driving system to obtain rebalance but again the necessary regulation is exceeded to thereby set up a continuous hunting of the driving system about the balance point.

The need for "anti-hunting" provisions in recording and controlling apparatus has long been recognized and various methods have been proposed heretofore for obtaining the same. One prior art method for preventing hunting is disclosed in Patent 1,827,520 issued to me on October 13, 1931, for Recording and control system and apparatus therefor, in which the speed of rebalance of an electrical network is effected in accordance with extent of unbalance thereof, and mechanically moving means are provided for anticipating the true balance position. In one other prior art method means are provided in the form of a generator driven by the driving system for obtaining an electromotive force proportional to the speed of the driving system. This electromotive force is introduced into the measuring or detector circuit in opposition to the unbalance electromotive force of the condition responsive network and operates to produce a condition of simulated rebalance of said network before the latter is actually rebalanced to thereby anticipate the true balance position of the network. As a result the driving system is slowed down before the balance position is reached and then gradually eases into said balance position without exceeding that position.

A specific object of my present invention is to provide anti-hunting means for use in recording and controlling apparatus in which an electromotive force proportional to the speed of rebalancing of the measuring network is obtained without requiring the use of a generator or other physically moving device additional to the rebalancing motive means.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Of the drawings:

Fig. 1 is a diagrammatic illustration of a self balancing Wheatstone bridge network utilizing the invention;

Figs. 1A, 1B, and 1C are fragmentary diagrams illustrating modifications of the arrangement of Fig. 1;

Fig. 2 illustrates a system employing the apparatus of Fig. 1 in a network of the potentiometric type;

Figure 1A:
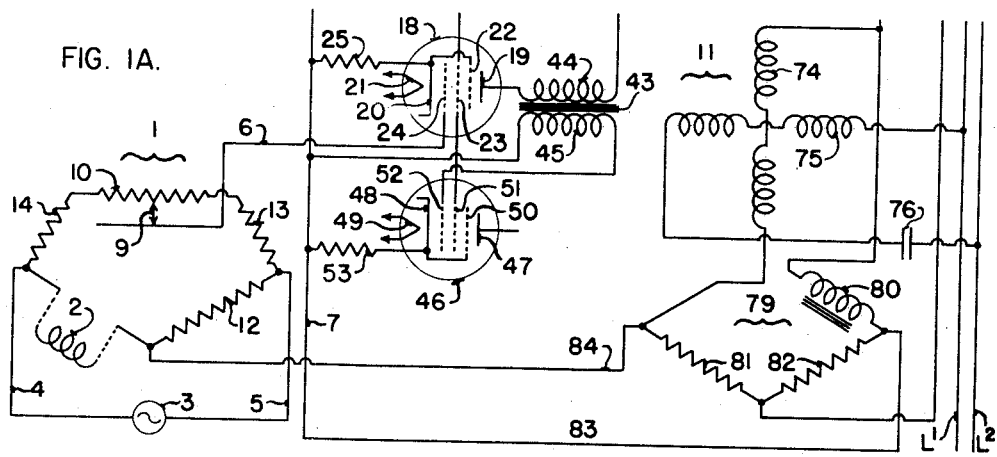

In Fig. 1 of the drawings an arrangement including an electronic amplifier device to be described is illustrated for producing effects in accordance with the extent of unbalance of a Wheatstone bridge network which controls the electronic device and is unbalanced in accordance with variation in a quantity to be measured, and in which because of the small magnitude of the unbalanced electromotive forces produced in the network it is not practicable nor desirable to have the said effects directly produced by the bridge network perform a control operation.

More specifically, an arrangement is illustrated in Fig. 1 for measuring and recording the temperature of a furnace (not shown) to which temperature a device 2 is responsive, said device being specifically illustrated as a coil of material having a substantial temperature coefficient of resistance and connected in one arm of the bridge network 1. Thus, on a change in the temperature of the furnace to which the device 2 is responsive, the bridge network 1 becomes unbalanced in one direction or the other and to an extent depending upon the direction and the magnitude, respectively, of the temperature change. Energizing current is supplied the bridge network 1 from a source of alternating current 3 of suitable frequency and, as shown, one pair of bridge conjugate points are connected by conductors 4 and 5 to said alternating current source. The other pair of bridge conjugate points are connected by conductors 6 and 7 to the terminals of the electronic device referred to and designated by the reference numeral 8. One of the last mentioned bridge conjugate points is the point of engagement of a sliding contact 9 with a slidewire resistance 10. The sliding contact 9 is adjusted along the slidewire resistance 10 in accordance with changes in the temperature to which the device 2 is responsive and in this form of my invention, this adjustment may conveniently be effected by a motor 11 which is selectively energized for rotation in one direction or the other by the electronic amplifier. The remaining arms of the bridge network are comprised of fixed resistances 12, 13, and 14.

On a change in the temperature of the furnace to which the device 2 is responsive, the resulting change in resistance of the latter unbalances the bridge network 1 and an unbalanced electromotive force will be impressed on the equalizing conductors 6 and 7. This unbalanced electromotive force will be of sign and amplitude determined by the direction and extent of change of the temperature being measured and is impressed on the input circuit of the amplifier 8 to thereby selectively control the energization of motor 11 for rotation in one direction or the other and hence movement of the sliding contact 9 in the proper direction to reduce the unbalanced electromotive force.

The shaft of motor 11 is connected in any convenient manner to a shaft 15 which may desirably be a rod having a spiral groove thereon and the sliding contact 9 is mounted on a carriage carried by shaft 15 and is adapted to be moved in one direction or the other as the shaft 15 is rotated. Thus, when the motor 11 is energized for rotation as a result of the network 1 becoming unbalanced, the motor will effect an adjusting movement of the contact 9 along the slidewire resistance 10 in the proper direction until the network is again rebalanced. The motor will then come to rest with the contact 9 at a new position along the slidewire resistance 10 which position will then be a measure of the temperature of the furnace to which the device 2 is responsive.

If desired, a pen may be mounted on the carriage which carries the potentiometer contact 9 and arranged in cooperative relation with a recorder chart 16 to thereby provide a continuous record of the temperature measured by the device 2. The chart 16 may be a strip chart as shown, and is adapted to be driven in any convenient manner as for example by a unidirectional motor 17 through suitable gearing (not shown) so that a record of the temperature to which the device 2 is subjected will be recorded as a continuous line on the chart. It will be apparent that the slidewire resistance 10 may be mounted on a circular form and that a circular chart may be employed for recording purposes in lieu of the strip chart 16, if desired.

As noted hereinbefore, unbalance of the bridge network 1 is detected by the electronic amplifier 8, the input terminals of which are connected by conductors 6 and 7 to the equalizing terminals of the bridge network. Specifically, the conductor 6 is connected to the control grid 24 of an electronic valve 18 and the conductor 7 is connected to the cathode 20 thereof, through a biasing resistance 25. The electronic valve 18 is a heater type pentode and includes an anode 19, a cathode 20, a heater filament 21, a suppressor grid 22, a screen grid 23, and the control grid 24.

Anode voltage is supplied the valve 18 from a voltage divider 26 which in turn is energized from a transformer 27 through a full wave rectifier valve 28. The transformer 27 is a combination step-up and step-down transformer and comprises a line voltage primary winding 29 connected to the supply lines $L^1$ and $L^2$, low voltage secondary windings 30, 31, and 32, and a high voltage secondary winding 33.

Valve 28 is a conventional full wave rectifier including a pair of anodes 34 and 35 and a filament type cathode 36 and is employed to maintain a direct current potential across the voltage divider 26. The filament cathode 36 is connected by conductors 37 and 38 to the low voltage secondary winding 30 and receives energizing current therefrom. The anode plates 34 and 35 of valve 28 are connected by conductors 39 and 40 to the terminals of the high voltage secondary winding 33 and the rectified current is connected across the terminals of voltage divider 26, a center tap of the secondary winding 33 being connected by a conductor 41 to one terminal of the voltage divider 26 and a center tap on the secondary winding 30 being connected by conductor 42 to the other terminal of the voltage divider. If desired, a suitable filter may be provided between conductors 41 and 42 and voltage divider 26.

As illustrated, the anode circuit of valve 18 includes a primary winding 44 of a transformer 43 which also includes a secondary winding 45. One terminal of the transformer secondary winding 45 is connected to the negative terminal of the voltage divider 26 and the other terminal of said secondary winding is connected to the control grid 52 of an electronic valve 46. Valve 46 is a heater type pentode and includes an anode 47 and a cathode 48, a heater filament 49, a suppressor grid 50, a screen grid 51 and a control grid 52. The heater filaments 21 and 49 of valves 18 and 46, respectively, receive energizing current from the low voltage transformer secondary winding 31 and may desirably be connected in parallel circuit relation across the terminals thereof. Anode voltage is supplied valve 46 from the voltage divider 26 and as illustrated, the cathode 48 is connected to the negative terminal of the voltage divider through a biasing resistance 53 and the anode 47 is connected to the positive terminal of the voltage divider through the primary winding 55 of a transformer 54 which also includes a secondary winding 56.

A center tap on the secondary winding 56 is connected through a biasing resistance 57 shunted by a condenser 58 to the cathodes 61 and 67 of a pair of tetrodes 59 and 65, respectively. One terminal of the secondary winding 56 is connected to the control grid 64 of valve 59 and the other terminal of the secondary winding is connected to the control grid 70 of valve 65. Valve 59 is a heater type tetrode and includes an anode 60, the cathode 61, a heater filament 62, a screen grid 63, and the control grid 64, and valve 65 is also a heater type tetrode and includes an anode 66, the cathode 67, a filament 68, a screen grid 69, and the control grid 70. The heater filaments 62 and 68 receive energizing current from the low voltage transformer secondary winding 32 and may desirably be connected in parallel circuit relation across the terminals thereof.

Valves 59 and 65 are connected in push-pull relation and as illustrated anode voltage is supplied the valves from the voltage divider 26 through a circuit which includes the primary winding 72 of a transformer 71 having a secondary winding 73. The anodes 60 and 66 are connected to opposite terminals of the primary winding 72 by conductors 74' and 75' respectively, and a center tap on the winding 72 is connected by a conductor 76' to the positive terminal of the voltage divider 26. The negative terminal of the voltage divider is connected by a conductor 77 to the negative end of the cathode biasing resistance 57 and therethrough to the cathodes 61 and 67.

In operation, when the bridge network 1 is balanced, valve 18 will conduct a steady and continuous current and as a result, valves 46, 59, and 65 will also conduct a steady and continuous current. When the bridge network 1 is unbalanced, however, an alternating voltage will be impressed between the control grid 24 and cathode 20 of valve 18, and as a result, the latter will conduct an undulating current to thereby cause the induction of an alternating voltage across the terminals of the secondary winding 45 of transformer 43. The voltage so induced in the winding 45 is impressed on the input circuit of valve 46 and causes the anode current conducted by the latter to be undulating. The flow of this current through the transformer primary winding 55 causes the induction of an alternating voltage across the terminals of the secondary winding 56 which voltage is impressed on the input circuits of valves 59 and 65. When an alternating voltage appears across the terminals of the transformer secondary winding 56, the potentials of grids 64 and 70 are swung in opposite phase at a frequency corresponding to the supply line frequency and the valves 59 and 65 are each alternately rendered conductive and non-conductive, one valve being conductive while the other is non-conductive. The resulting pulsating current flows through transformer primary winding 72 in successively opposite directions through opposite halves of the transformer result in the induction of an alternating voltage of supply line frequency in the transformer secondary winding 73, whose phase and amplitude is determined by the direction and magnitude of the unbalance of bridge network 1.

The terminals of the transformer secondary winding 73 are connected to one phase winding 74 of the motor 11 which as illustrated is a two-phase rotating field motor, and the other phase winding 75 thereof is connected to the supply lines $L^1$ and $L^2$ through a suitable condenser 76. Due to the action of condenser 76, the current flow through the motor winding 75 will lead the line current by approximately 90° and since the motor winding 74 is arranged to be energized by currents in phase or 180° out of phase with the line current, the magnetic field set up by these windings will be displaced by approximately 90° in space with the result that a rotating magnetic field will be set up in the motor in one direction or the other and the motor rotor will accordingly be rotated in a corresponding direction. Thus depending upon the direction of the unbalance of bridge network 1, the motor will be selectively energized for rotation in one direction or the other and as will be apparent, the motor speed will be directly dependent upon the magnitude of such unbalance. As illustrated, a condenser 78 may desirably be connected across the terminals of the transformer primary winding 72 for tuning to resonance the transformer 71 and its load consisting of the motor windings so that the current flows through the motor winding 74 will be at a maximum value for any unbalance of the bridge network 1.

In order that the speed of motor 11 may be as great as possible during rebalancing without overshooting of the balance point, and consequent hunting taking place, means have been provided to insure that the motor speed and rate of change of its speed is substantially proportional to the extent of unbalance. This result is obtained by introducing into the network a voltage whose magnitude is a function of the motor speed and whose phase is determined by the direction of rotation thereof. This damping feature, although obtained electrically herein, is substantially the same as that disclosed in my prior patent mentioned hereinbefore, in which the rate of rebalance of a potentiometer measuring circuit and an arresting of the motive means when the rebalancing movement has been proportional to the unbalance are controlled by mechanical means. Thus, as the sliding contact 9 approaches its new balance position, the unbalance voltage will decrease in value and if the motor speed is then such that it would ordinarily coast beyond the balance position due to its inertia, the opposing voltage which is introduced into the circuit will be appreciably greater than the unbalance voltage and will tend to effect energization of the motor in the opposite direction and thereby produces a positive damping action which will check the motor speed before the balance position is reached and gradually reduce it to zero as the unbalance is reduced to zero.

Figure 1B:
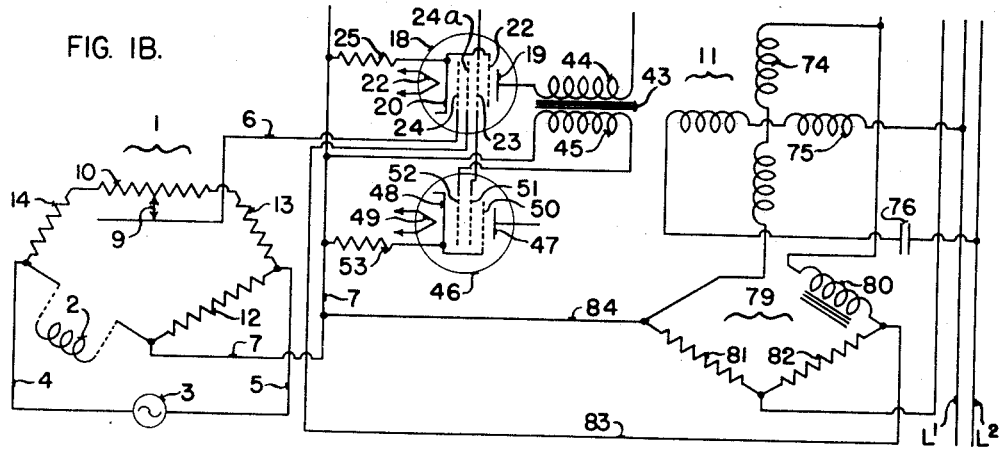
Figure 1C:
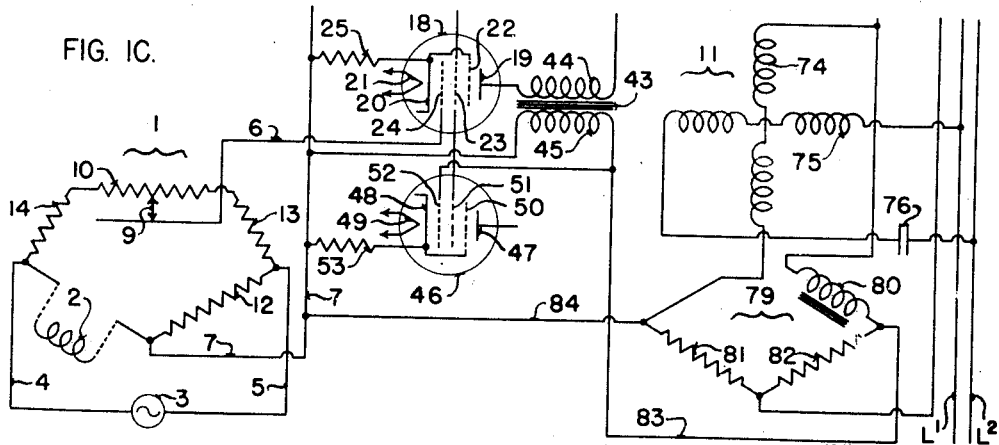

Specifically, the means provided for obtaining such an anti-hunting effect includes an electrical network 79 having as one of its component parts the motor phase winding 74. Network 79 comprises a Wheatstone bridge circuit, one arm of which includes the motor winding 74 and an opposing arm of which includes a fixed inductance 80. The remaining arms of the bridge network are made up of fixed resistances 81 and 82. One pair of terminals of bridge network 79 are connected to the terminals of the transformer secondary winding 73 and the remaining pair of terminals are connected by conductors 83 and 84 to the equalizing terminals of the bridge network 1. It is noted the inductance 80 and resistances 81 and 82 are so chosen that the flow of current through the bridge network 79 from the amplifier output terminals, on unbalance of the bridge network 1, does not cause any current flow through the conductors 83 and 84. As illustrated, a condenser 85 of suitable value is connected in circuit with conductor 83. It is noted that the last mentioned pair of terminals of the bridge network 79 may be connected in series circuit relation with the equalizing terminals of bridge network 1 instead of in parallel therewith, as illustrated more or less diagrammatically in Fig. 1A. Or, if desired, these terminals of bridge network 79 may be connected to the input circuit of amplifier 8 independently of the bridge network as illustrated more or less diagrammatically in Fig. 1B. As illustrated in Fig. 1B, the valve 18 may be provided with an additional control grid 24a and the conductors 83 and 84 of the bridge network 79 connected between that control grid and the cathode 20. Or, if desired, the conductors 83 and 84 may be connected into the input circuit of a later stage of the amplifier as illustrated in Fig. 1C wherein the conductors 83 and 84 are connected to the input terminals of the valve 46 in parallel with the transformer secondary winding 45.

The electromotive force referred to for preventing hunting of motor 11 is induced in the motor winding 74 as a result of transformer action between the windings 74 and 75. When motor 11 is stationary, the bridge network 79 is balanced and no lines of the magnetic flux set up by winding 75 link any turns of the winding 74 to unbalance the bridge since these windings are displaced 90° with respect to each other on motor 11 and hence, the electromotive force induced in winding 74 by transformer action will be zero. On rotation of the motor, however, the magnetic flux set up by winding 75 will be distorted and some lines of flux will link the winding 74 to cause the induction of an electromotive force therein. It will be noted the magnetic flux set up by winding 75 is distorted in one direction or the other depending upon the direction of rotation of the motor 11 and the extent of distortion is dependent upon the speed of rotation. Thus, the phase of the electromotive force induced in winding 74 is determined by the direction of rotation of motor 11 and the amplitude of said electromotive force is dependent upon the speed of rotation of said motor. As will be readily apparent by providing a feedback network as illustrated and described, this electromotive force derived as a result of motor rotation may be utilized to prevent hunting of the motor.

As will be apparent, when the voltage drop across winding 74 is so varied, the bridge network 79 will become unbalanced since a corresponding change in voltage drop is not produced across the fixed inductance 80. As the motor 11 gains speed, therefore, an electromotive force will be impressed on conductors 83 and 84 and thereby on the amplifier input circuit, which electromotive force is proportional to the speed of rotation of motor 11 and is opposite in phase to the electromotive force impressed on the amplifier by the bridge network 1. Thus, as motor 11 gains speed, the unbalance of bridge network 1 is partially compensated for by the resulting unbalance of network 79 to thereby establish a new and temporary balance position of sliding contact 9 along slidewire resistance 10. When contact 9 subsequently approaches said position, motor 11 will be deenergized and slow down to effect a reduction in the unbalance of network 79 and thereby cause a shifting in the new balance position toward the true balance position. Thus, as described hereinbefore, as the slidewire contact 9 approaches its new balance position, the energization of motor 11 will be so interrupted before said position is reached that contact 9 will gradually ease into its new balance position without overshooting.

In Fig. 2 I have illustrated more or less diagrammatically another advantageous use of my invention in which a thermocouple 86 is arranged to measure the temperature of the interior of a furnace 87. As shown, the terminals of the thermocouple are connected by conductors 88 and 89 to the terminals of a null point potentiometric network 90 which may be of any suitable type such as the Brown potentiometric network disclosed in my prior Patent 1,898,124 issued February 21, 1933. The moving coil of a galvanometer 91 is connected in the conductor 89 by means of pigtails or slip rings 92 and 93 and a pick-up coil 94 which is positioned in an alternating magnetic field is connected to the pivot of the galvanometer coil and is arranged to be rotated therewith. The pick-up coil is positioned between the poles of a suitable field structure 95 on which is wound a field winding 96 which is energized from the alternating current supply lines $L^1$ and $L^2$ and is so arranged with respect to the poles of the field structure 95 that when the galvanometer moving coil is in its undeflected position, the pick-up coil is in zero inductive relation to the alternating magnetic field set up in the field structure. When the galvanometer moving coil deflects in one direction or the other, the pick-up coil deflects accordingly and as a result an alternating voltage in phase with or 180° out of phase with the line voltage will be induced in the pick-up coil.

The potentiometer network 90 is of a well-known type and it is sufficient for the present purposes to know that the potentiometer network includes a circuit branch including the thermocouple 86, an opposing circuit branch including a source of known potential such as battery 97, and resistors 98, a variable portion of which may be connected into the opposed branches by means of a sliding contact 99 whereby the respective effects of the variable and known sources are made equal and opposite and the galvanometer moving coil is thus rendered undeflected when the circuit is balanced for a given value of the E. M. F. of the thermocouple 86 with contact 99 in a corresponding position along resistances 98. The position of the contact 99 is then a measure of the value of the thermocouple E. M. F. and may serve as a measure of the temperature to which it is exposed.

This form of my invention is concerned with the means by which the contact 99 is adjusted back and forth along resistances 98 in response to galvanometer deflection and as shown includes a motor 11 which is adapted to be selectively energized for rotation in one direction or the other from an amplifier 8, not shown in Fig. 2. When the thermocouple voltage changes, the galvanometer moving coil will be deflected in one direction or the other and thereby the pick-up coil 94 will be rotated into inductive relation with the alternating magnetic field set up by the field structure 95 resulting in the induction of an alternating voltage in the pick-up coil. The phase and amplitude of the alternating voltage so induced is determined by the direction and extent of deflection, respectively. This induced alternating voltage is connected through suitable pigtails or slip rings 100 and 101 to the input terminals of the amplifier 8 so that depending upon the direction of galvanometer deflection, the motor 11 will be energized for rotation in a corresponding direction to effect an adjustment of the contact 99 along resistances 98 to rebalance the potentiometric circuit. A bridge network 79 may desirably be employed in the arrangement of Fig. 2 as well as in the arrangement of Fig. 1 for preventing overshooting of the rebalance position.

The shaft of motor 11 is connected in any convenient manner to a screw shaft 102 and the potentiometer contact 99 is mounted on a carriage carried by shaft 102 and is adapted to be moved in one direction or the other as the shaft 102 is rotated. Thus, when the motor 11 is energized for rotation as a result of change in the thermocouple E. M. F., the motor will effect an adjusting movement of contact 99 along resistances 98 in the proper direction until the potentiometer circuit is again balanced. The galvanometer deflection will then be reduced to zero and the motor will come to rest with the contact 99 at a new position along resistances 98 which position will then be a measure of the temperature of the interior of furnace 87.

If desired, a pen may be mounted on the carriage which carries the potentiometer contact 99 and arranged in cooperative relation with a recorder chart 103 to thereby provide a continuous record of the temperature of the interior of furnace 87. The chart 103 may be a strip chart as shown, and is adapted to be driven in any convenient manner, as, for example, by a unidirectional motor 104 through suitable gearing (not shown) so that a record of the temperature to which the thermocouple 86 is subjected will be recorded as a continuous line on the chart.

Figure 3:
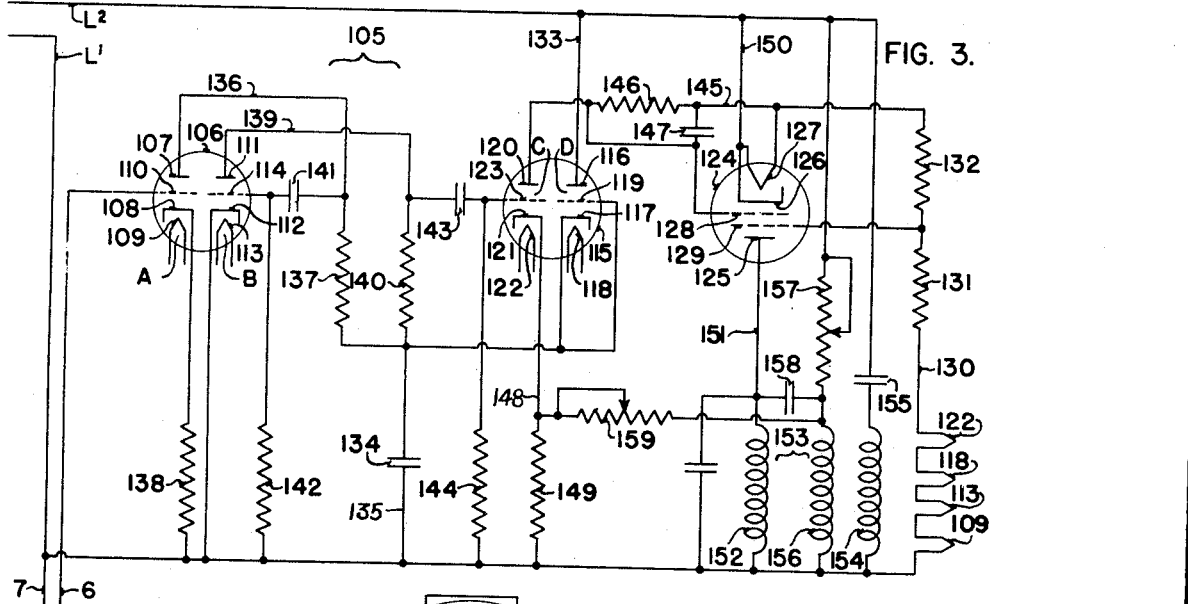
Fig. 3 illustrates a modification of the arrangement of Figs. 1 and 2.

In Fig. 3 I have illustrated more or less diagrammatically a modified circuit arrangement for controlling the motive means for rebalancing the measuring circuits of the Figs. 1 and 2 arrangements in a minimum of time without overshooting. As illustrated, an electronic amplifier 105 is employed in lieu of the amplifier 8 of the Fig. 1 arrangement and the bridge network 79 has been dispensed with in deriving an electromotive force proportional to the speed of rotation of the motive system. This electromotive force, moreover, is impressed into a later stage of the amplifier circuit employed instead of into the input circuit thereof, as in the Fig. 1 arrangement, although it may be impressed on the input circuit, if desired.

Specifically, the amplifier 105 includes an electronic valve 106 which, as shown, is a twin amplifier type including two triodes in one envelope. The unbalance voltage of the bridge network 1 of the Fig. 1 arrangement, or the potentiometer network of the Fig. 2 arrangement is impressed by conductors 6 and 7 on the input circuit of one of the triodes of valve 106. For convenience in describing the circuit connections, this triode will be referred to hereinafter as the triode A and the second mentioned triode will be referred to as the triode B. The triode A includes an anode 107, a cathode 108, a heater filament 109, and a control grid 110, and the triode B includes an anode 111, a cathode 112, a heater filament 113, and a control grid 114.

Energizing current is supplied heater filaments 109 and 113 through a circuit which includes the heater filaments 118 and 122 of a twin type electronic valve 115 and the heater filament 127 of an electronic valve 124, and may be traced from the supply conductor $L^1$ to the heater filaments 109, 113, 118, 122, a conductor 130 in which a pair of resistances 131 and 132 are inserted, and the heater filament 127, to the supply conductor $L^2$. One triode section of valve 115 includes an anode 116, a cathode 117, the heater filament 118, and a control grid 119 which as shown is connected directly to the cathode 117, and the other triode section includes an anode 120, a cathode 121, the heater filament 122, and a control grid 123.

Direct current anode voltage is supplied both triode sections of valve 106 through a circuit which utilizes the rectifying action of one triode section of valve 115 and may be traced from the supply conductor $L^2$ to a conductor 133, the anode 116 and cathode 117 of one triode section of valve 115 to one terminal of a condenser 134 which constitutes the positive side of a half wave rectifying unit. The negative terminal of condenser 134 is connected by a conductor 135 to the supply conductor $L^1$ and as will be apparent, the condenser 134 operates to smooth out the pulsations in the rectified current flow through the circuit including the anode 116 and cathode 117 of valve 115 which impresses a definite constant voltage across its terminals.

As illustrated, the anode 107 of triode A is connected to the positive terminal of condenser 134 by a conductor 136, in which a resistance 137 is inserted, and the cathode 108 is connected to the negative terminal thereof through a biasing resistance 138. Similarly, the anode 111 of triode B is connected by a conductor 139, in which a resistance 140 is inserted, to the positive terminal of the condenser 134 and the cathode 112 is connected directly to the negative terminal of the condenser.

The output circuit of the triode A is resistance capacity coupled by a condenser 141 and a resistance 142 to the input circuit of the triode B and the output circuit of triode B is resistance capacity coupled by a condenser 143 and a resistance 144 to the input circuit of the triode section of valve 115 which includes the anode 120 and designated for convenience by the reference numeral C. Anode voltage is supplied this triode section directly from the alternating current supply conductors $L^1$ and $L^2$ through a circuit which may be traced from the supply conductor $L^2$, to the heater filament 127 of valve 124, a conductor 145 in which a resistance 146 shunted by a condenser 147 is inserted, anode 120, cathode 121, and a conductor 148, in which a biasing resistance 149 is inserted, to the supply conductor $L^1$. Condenser 147 connected across resistance 146 is employed for smoothing out the pulsating current flows through resistance 146 so that when an alternating potential in phase with the supply line voltage is impressed on the input circuit of the triode section C, the potential drop across resistance 146 will gradually increase in value until a condition of equilibrium is reached, and when an alternating potential 180° out of phase with the supply line voltage is impressed on the input circuit of this triode, the potential drop across resistance 146 will gradually decrease in value. It is thus seen that a direct current potential is maintained across resistance 146 which varies in magnitude in accordance with the phase and magnitude of an alternating signal impressed on the input circuit of amplifier 105 by conductors 6 and 7.

In operation, when an alternating voltage is applied to the input circuit of triode A, the latter will be alternately rendered conductive and non-conductive and accordingly a pulsating potential drop will be produced across resistance 137 to alternately raise and lower the potential of the control grid 114 of triode B relatively to the cathode 112. Triode B will then be alternately rendered conductive and non-conductive to produce a pulsating potential drop across resistance 140 and thereby to alternately raise and lower the potential of control grid 123 of triode C relatively to cathode 121. Depending upon the phase relation of the pulsating potential applied to the grid 123 with respect to the alternating voltage impressed on the anode 120, that is, depending upon whether the two voltages are in phase or 180° out of phase, the triode C will be rendered less conductive or more conductive during the half cycles when the anode 120 is positive and the potential across resistance 146 will be varied to a corresponding extent. Due to the action of condenser 147, however, the potential drop across resistance 146 will not have a pulsating characteristic, but will gradually rise when an alternating potential in phase with the supply line voltage is applied to the control grid 123 of valve 115 and gradually fall when an alternating potential 180° out of phase with the supply line voltage is applied to the control grid 123.

As shown, the negative end of resistance 146 is connected to the control grid 128 of valve 124 and the anode circuit of the latter is connected across the alternating current supply lines in an inverted position with respect to the connection thereacross of the anode circuit of the triode C. The anode circuit of valve 124 may be traced from the supply line L² to a conductor 150, cathode 126, anode 125, and a conductor 151 to one terminal of the phase winding 152 of a reversible motor 153 and therethrough to the supply line L¹. Valve 124 also includes a screen grid 129 which is connected to a point in the network which is at a suitable potential and as shown may be connected to the point of connection of resistances 131 and 132. It will thus be seen valve 124 is arranged to be energized directly from the alternating current supply lines L¹ and L² and that the pulsating current conducted by this valve is adapted to be varied in accordance with the magnitude of the direct current potential maintained across resistance 146.

Figure 4:
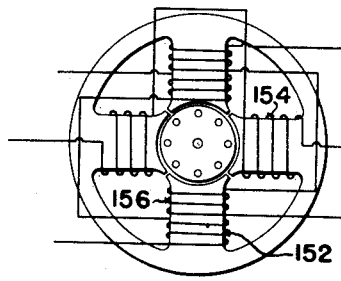
Fig. 4 illustrates in detail the reversible motor employed in the driving system of Fig. 3.

The reversible motor 153 referred to is illustrated in detail in Fig. 4 and, as will be noted, is of the induction variety. Motor 153 may be of the type disclosed schematically in Fig. 1 but in this arrangement I have shown motor 153 as including three windings instead of two. One winding 154 is continuously energized from the alternating current supply conductors L¹ and L² through a suitable condenser 155. Winding 152 is energized by the current flow conducted by valve 124 and the third winding 156 is energized from the alternating current supply conductors through an adjustable resistance 157. A condenser 158 is connected between the anode 125 of valve 124 and the point of connection of winding 156 with resistance 157. Windings 152 and 156 are so wound on motor 153 with respect to the manner in which winding 154 is wound there- on that when the effective impedance of the circuits including the windings 152 and 156 are equal, the motor 153 will not be actuated for rotation in either direction but will remain stationary, but when one winding is energized to a greater extent than the other, the motor will be actuated for rotation in a corresponding direction. That is to say, when the anode to cathode resistance of valve 124 is approximately equal to the adjusted value of resistance 157, the torque developed by winding 152 for producing rotation of motor 153 will be equal and opposite to that developed by winding 156 and, consequently, the motor will remain stationary. When the anode to cathode resistance of valve 124 is increased or decreased, however, the torque developed by winding 152 will increase and decrease, respectively, and the motor will be actuated for rotation in a corresponding direction.

In this arrangement, means are provided for preventing overshooting of the balance point of the network 1 of Fig. 1 or the network 90 of Fig. 2 in the form of a connection between the point of engagement of motor winding 156 with resistance 157 and the cathode 121 of triode C, which connection includes an adjustable resistance 159. This connection impresses a biasing voltage across resistance 149 in the cathode circuit of the triode C, and as noted hereinbefore, this biasing voltage varies proportionately with the speed of rotation of motor 153 and is of polarity depending upon the direction of rotation of the motor so that as the motor gains speed a voltage is impressed on resistance 149 which renders the signal impressed on the control grid 123 by the triode B ineffective to control the conductivity of the triode C, and as a result the energization of motor 153 is interrupted. As the motor speed subsequently falls off, the voltage fed back across resistance 149 diminishes and as a result, the motor energization for rotation is again increased. This action continues until the primary network 1 or 90 is rebalanced and permits the motor to be extremely fast in its action without overshooting taking place. The degree of damping desired may be obtained by adjustment of resistance 159. It is noted the magnitude of the feed back voltage is greatly enhanced when a condenser 158 is employed and connected as shown.

Figure 5:
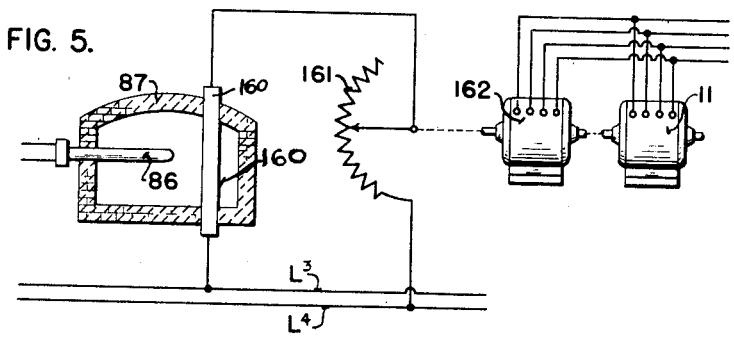
Fig. 5 is a diagrammatic illustration of the use of the invention in a control system.

It will be apparent, the motor 11 or 153 may be employed to operate a control valve for controlling the supply of heating agent to the furnace 87 of Fig. 2 to the temperature of which the thermocouple 86 is responsive or another motor desirably operated together with the motor 11 or 153 may be so employed. For example, as shown in Fig. 5, the furnace 87 to the heat of which the thermocouple 86 is responsive, is heated by a resistance 160 which is connected to electric supply conductors L³ and L⁴ through a rheostat 161, the adjustment of which is effected by a motor 162. The motor 162 may be exactly like either motor 11 or 153 and is shown like motor 11 and connected in parallel therewith. The mechanical connection of the rheostat 161 to the motor 162 is such as to increase and decrease the supply of electric current to the resistance 160 as the temperature to which the thermocouple 86 is responsive drops below or rises above a predetermined level.

Subject matter disclosed in this application and not claimed is being claimed in my copending applications Serial No. 102,482, filed September 25, 1936, and Serial No. 159,198, filed August 14, 1937.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. A system comprising an electrical network, means for producing an unbalanced electromotive force in said network, a device adjustable to reduce said unbalanced electromotive force, a motor having a winding for adjusting said device, means including a detector responsive to the said unbalanced electromotive force for selectively energizing said winding with current of one phase or of opposite phase in accordance with the sense of said unbalanced electromotive force, and a second network controlling said detector, said second network including said winding and producing an electromotive force proportional to the motor speed and in opposition to the said unbalanced electromotive force.

2. A system comprising an electrical network, means for producing an unbalanced electromotive force in said network, a device adjustable to reduce said unbalanced electromotive force, a motor having a winding for adjusting said device, means including a detector responsive to the said unbalanced electromotive force for selectively energizing said winding with current of one phase or of opposite phase in accordance with the sense of said unbalanced electromotive force, a second network including said winding to produce an electromotive force proportional to the motor speed, and means for opposing said last mentioned electromotive force to the said unbalanced electromotive force.

3. A system comprising an electrical network, means for producing an unbalanced electromotive force in said network, a device adjustable to reduce said unbalanced electromotive force, a motor having a plurality of windings for adjusting said device, means for continuously energizing one of said windings, a device responsive to said unbalanced electromotive force for selectively controlling the energization of another of said windings with current of one phase or of opposite phase in accordance with the sense of said unbalanced electromotive force, a second network controlling said detector and including said second mentioned winding to produce an electromotive force proportional to the motor speed, and means for opposing said last mentioned electromotive force to said unbalanced electromotive force.

4. A system comprising an electrical network, means for producing an unbalanced electromotive force in said network, a device adjustable to reduce said unbalanced electromotive force, a motor having a winding for adjusting said device, means including an electronic device responsive to the said unbalanced electromotive force for selectively energizing said winding with current of one phase or of opposite phase in accordance with the sense of said unbalanced electromotive force, and a second network controlling said electronic device, said second network including said winding and producing an electromotive force proportional to the motor speed and in opposition to the said unbalanced electromotive force.

5. A system comprising an electrical network, means for producing an unbalanced electromotive force in said network, a device adjustable to reduce said unbalanced electromotive force, a motor having a winding for adjusting said device, electrical energizing means, an electronic device energized by said last mentioned means and responsive to the said unbalanced electromotive force for selectively energizing said winding with current of one phase or of opposite phase in accordance with the sense of said unbalanced electromotive force, a second network including said winding to produce an electromotive force proportional to the motor speed, and means for opposing said last mentioned electromotive force to said unbalanced electromotive force.

6. A system comprising an electrical network, means for producing an unbalanced electromotive force in said network, a device adjustable to reduce said unbalanced electromotive force, a motor having a winding for adjusting said device, a detector responsive to the said unbalanced electromotive force for selectively controlling the energization of said winding in one or another sense in accordance with the sense of said unbalanced electromotive force, and a bridge network controlling said detector, said bridge network including said winding in one arm thereof and producing an electromotive force proportional to the motor speed and in opposition to the said unbalanced electromotive force.

7. A system comprising an electrical network, means for producing an unbalanced electromotive force in said network, a device adjustable to reduce said unbalanced electromotive force, a motor having a winding for adjusting said device, a detector responsive to the said unbalanced electromotive force for selectively controlling the energization of said winding in one or another sense in accordance with the sense of said unbalanced electromotive force, and a bridge network controlling said detector, said bridge network including said winding in one arm and a fixed inductance in another arm and producing an electromotive force proportional to the motor speed and in opposition to said unbalanced electromotive force.

8. A system comprising an electrical network, means for producing an unbalanced electromotive force in said network, a device adjustable to reduce said unbalanced electromotive force, a motor having a winding for adjusting said device, an electronic amplifier responsive to the said unbalanced electromotive force for selectively controlling the energization of said winding in one or another sense in accordance with the sense of said unbalanced electromotive force, a bridge network having its energizing terminals connected to the output circuit of said electronic amplifier and including said winding in one arm thereof, and a connection between the balancing terminals of said bridge network and the input circuit of said amplifier.

9. A system comprising an electrical network, means for producing an unbalanced electromotive force in said network, a device adjustable to reduce said unbalanced electromotive force, a motor for adjusting said device, said motor having a winding, an electronic device having an input circuit and an output circuit and responsive to said unbalanced electromotive force, a connection from the output circuit of said electronic device to said winding, means for establishing a magnetic flux in said motor which flux does not normally link the turns of said winding to any substantial extent but is adapted to be distorted on rotation of said motor, and a direct electrical connection from the input circuit of said electronic device to said winding.

10. A system comprising an electrical network, means for producing an unbalanced electromotive force in said network, a device adjustable to reduce said unbalanced electromotive force, a motor for adjusting said device, said motor having a winding, an electronic device having an input circuit and an output circuit and responsive to said unbalanced electromotive force, a connection from the output circuit of said electronic device to said winding, means for establishing a magnetic flux in said motor which flux does not normally link the turns of said winding to any substantial extent but is adapted to be distorted on rotation of said motor, and means for arresting the operation of said motor at a desired point, said last mentioned means including a direct electrical connection from the input circuit of said electronic device to said winding.

11. A system comprising an electrical network, means for producing an unbalanced electrical effect in said network, a device adjustable to reduce said unbalanced electrical effect, a motor for adjusting said device, said motor having a winding, means including a detector responsive to said unbalanced electrical effect and having a connection to said winding for controlling the selective energization thereof with current of one phase or of opposite phase, and means for arresting the operation of said motor at a desired point including means for producing an electrical effect in said winding and opposing said last mentioned electrical effect to said unbalanced electrical effect.

12. The combination with an electrical network having an electrical characteristic to be regulated of an electrical driving motor, an impedance connected in said network and adapted to be adjusted by said motor to restore said electrical characteristic to a predetermined state on deviation therefrom, a device responsive to the state of said characteristic, said motor having a winding connected to said device, means for establishing a magnetic flux in said motor which flux does not normally link the turns of said winding to any substantial extent but is adapted to be distorted on rotation of said motor, and means for arresting the network regulation substantially at a desired point including a direct electrical connection between said winding and said network.

13. A system comprising an electrical network unbalanced by change in magnitude of a condition under measurement, means for rebalancing said network on unbalance thereof including a detector responsive to said unbalance and an electrical motor having a winding adapted to be selectively energized in one sense or another by said detector in accordance with the sense of unbalance of said network, means for establishing a magnetic flux in said motor which flux does not normally link the turns of said winding to any substantial extent but is adapted to be distorted on rotation of said motor, and means for arresting the operation of said motor at substantially a desired point including an electrical connection between said winding and said network.

14. A system comprising an electrical network, means for producing an unbalanced electromotive force in said network, a device adjustable to reduce said unbalanced electromotive force, a motor for adjusting said device, said motor having a winding the energization of which is selectively controlled by said unbalanced electromotive force, means for establishing a magnetic flux in said motor which flux cooperates with the flux set up by said winding when energized to produce rotation of said motor and does not normally link the turns of said winding to any substantial extent but is adapted to be distorted on rotation of said motor to induce an electromotive force in said winding, and means to arrest the operation of said motor at a desired point including means to oppose said electromotive forces.

15. The combination with an electrical network having an electrical characteristic to be regulated of an electrical driving motor, an impedance connected in said network and adapted to be adjusted by said motor to restore said electrical characteristic to a predetermined state on deviation therefrom, a device responsive to the state of said characteristic, said motor having a winding connected to said device, means for establishing a magnetic flux in said motor which flux does not normally link the turns of said winding to any substantial extent but is adapted to be distorted on rotation of said motor, and means for arresting the network regulation substantially at a desired point including an electrical connection between said winding and said network.

16. The combination with an electrical network having an electrical characteristic to be regulated of an electrical driving motor, an impedance connected in said network and adapted to be adjusted by said motor to restore said electrical characteristic to a predetermined state on deviation therefrom, a device responsive to the state of said characteristic, said motor having a rotatable armature and a winding connected to said device, means for establishing a magnetic flux in said motor which flux does not normally link the turns of said winding to any substantial extent when said armature is stationary but is adapted to be distorted to thereby lnk at least some of the turns of said winding when said armature is rotated, and a connection between said winding and said network.

17. The combination with an electrical network having an electrical characteristic to be regulated of a reversible electrical motor, an impedance connected in said network and adapted to be adjusted by said motor to restore said electrical characteristic to a predetermined state on deviation therefrom, a device responsive to the state of said characteristic, said motor having a winding connected to said device and a winding to establish a magnetic flux in said motor which flux does not normally link the turns of said winding to any substantial extent but is adapted to be distorted on rotation of said motor, and means for arresting the network regulation substantially at a desired point including an electrical connection between said first mentioned winding and said network.

18. The combination with an electrical network having an electrical characteristic to be regulated of an electronic device under control of said network and an electrical motor, said motor having a winding connected to said electronic device, an impedance connected in said network and adapted to be adjusted by said motor to restore said electrical characteristic to a predetermined state on deviation therefrom, means for establishing a magnetic flux in said motor which flux does not normally link the turns of said winding to any substantial extent but is adapted to be distorted on rotation of said motor, and means for arresting the network regulation substantially at a desired point including an electrical connection between said winding and said network.

19. The combination with an electrical network having an electrical characteristic to be regulated of an electronic device under control of said network and a reversible electrical motor, said motor having a winding connected to said electronic device and a winding continuously energized from an electrical current supply source to establish a magnetic flux in said motor, which flux does not normally link the turns of said first mentioned winding to any substantial extent but is adapted to be distorted on rotation of said motor, an impedance connected in said network and adapted to be adjusted by said motor to restore said electrical characteristic to a predetermined state on deviation therefrom, and means for arresting the network regulation substantially at a desired point including an electrical connection between said first mentioned winding and said network.

20. The combination with an electrical network having an electrical characteristic to be regulated of an electronic device under control of said network and a reversible electrical motor, said motor having a winding connected to said electronic device and a rotatable armature, an impedance connected in said network and adapted to be adjusted by said motor to restore said electrical characteristic to a predetermined state on deviation therefrom, means for establishing a magnetic flux in said motor which flux does not link the turns of said winding to any substantial extent when said armature is stationary, but is adapted to link at least some of the turns of said winding when said armature is rotated, and an electrical connection between said winding and said network.

21. A system comprising an electrical network, means for producing an unbalanced electrical effect in said network, a device adjustable to reduce said unbalanced electrical effect, a motor for adjusting said device, said motor having a winding, means for establishing a magnetic field in said motor which field does not normally link the turns of said winding to any substantial extent, but is adapted on rotation of said motor to be distorted to produce an electrical effect in said winding, a detector responsive to said unbalanced electrical effect and having a connection to said winding for controlling the selective energization thereof, and means for arresting the operation of said motor substantially at a desired point including an electrical connection having a capacitive reactance therein superimposing said second mentioned electrical effect on said unbalanced electrical effect.

THOMAS R. HARRISON.